(12) United States Patent
Uehara

(10) Patent No.: US 8,156,263 B2
(45) Date of Patent: Apr. 10, 2012

(54) INFORMATION PROCESSING APPARATUS AND STORAGE DEVICE CONTROL METHOD

(75) Inventor: Keiichi Uehara, Oume (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 85 days.

(21) Appl. No.: 12/684,029

(22) Filed: Jan. 7, 2010

(65) Prior Publication Data

US 2010/0228889 A1 Sep. 9, 2010

(30) Foreign Application Priority Data

Mar. 4, 2009 (JP) ................................. 2009-051210

(51) Int. Cl.
*G06F 13/00* (2006.01)
*G06F 3/00* (2006.01)
(52) U.S. Cl. ............... 710/40; 710/5; 710/8; 710/36; 710/62
(58) Field of Classification Search .................. None
See application file for complete search history.

(56) References Cited

U.S. PATENT DOCUMENTS

2010/0070744 A1* 3/2010 Barry et al. .................. 713/2

FOREIGN PATENT DOCUMENTS

| JP | 04-330525 | 11/1992 |
|---|---|---|
| JP | 04-330525 A | 11/1992 |
| JP | 05-100827 | 4/1993 |
| JP | 05-100827 A | 4/1993 |
| JP | 2006-127267 | 5/2006 |
| JP | 2006-127267 A | 5/2006 |
| JP | 2007-148714 A | 6/2007 |
| JP | 2008-310712 A | 12/2008 |

OTHER PUBLICATIONS

Tripplet, Josh, Bootstrapping embedded linx, Jul. 16, 2008 [online, accessed on May 12, 2011], URL:http://psas.pdx.edu/Presentations/embedded-linux.pdf.*
Notification of Reason for Refusal mailed by Japan Patent Office on Mar. 23, 2010 in the corresponding Japanese Patent Application No. 2009-051210.
Notification of Reason for Refusal mailed by Japan Patent Office on Jul. 6, 2010 in the corresponding Japanese Patent Application No. 2009-051210.

* cited by examiner

*Primary Examiner* — Tariq Hafiz
*Assistant Examiner* — Scott Sun
(74) *Attorney, Agent, or Firm* — Knobbe Martens Olson & Bear, LLP

(57) ABSTRACT

An information processing apparatus includes: a processor configured to run an operating system; a plurality of storage devices connected to the processor; a detection module configured to detect a boot process for installing the operating system; a determination module configured to acquire device information from each of the storage devices and determine priority rank of the storage devices based on the device information when the detection module detects the boot process being originated from a device other than the storage devices; and a control module configured to install the operating system in a target storage device that is selected from among the storage devices, the target storage device having the highest priority rank determined by the determination module.

8 Claims, 6 Drawing Sheets

FIG. 6

| MODEL NAME | DATA TRANSFER RATE (READ) | DATA TRANSFER RATE (WRITE) |
|---|---|---|
| SSD-TSB001245 | 100MB/s | 70MB/s |
| SSD-TSB987654 | 80MB/s | 60MB/s |
| ⋮ | ⋮ | ⋮ |

FIG. 7

BIOS SETUP

Access settings to be employed at the time of OS installation

Device

SATA 0    SSD-TSB001245    enable

SATA 1    HDD-TSB099811    disable

INFORMATION PROCESSING APPARATUS AND STORAGE DEVICE CONTROL METHOD

CROSS REFERENCE TO RELATED APPLICATION(S)

The present disclosure relates to the subject matters contained in Japanese Patent Application No. 2009-051210 filed on Mar. 4, 2009, which are incorporated herein by reference in its entirety.

FIELD

The present invention relates to an information processing apparatus and a method for controlling a storage device connected to the information processing apparatus for installing an operating system in an optimum storage device from among a plurality of storage devices.

BACKGROUND

In information processing apparatus such as personal computers having plural storage devices, a user is required to select a target device to which an operating system is to be installed from among the storage devices. And a technique is disclosed in which boot settings of respective storage devices are configured by the user by changing BIOS settings. For example, a related-art document JP-A-5-100827 discloses a technique allowing the user to set boot priority order of storage devices or to make a boot prohibition setting of a storage device by changing BIOS settings.

However, in the technique disclosed in JP-A-5-100827, in an information processing apparatus having plural storage devices, an operating system cannot be installed in an optimum storage device that is automatically selected from among a plurality of storage devices.

BRIEF DESCRIPTION OF THE DRAWINGS

A general configuration that implements the various feature of the invention will be described with reference to the drawings. The drawings and the associated descriptions are provided to illustrate embodiments of the invention and not to limit the scope of the invention.

FIG. 6 schematically shows an example table used in the storage device control method of FIG. 5.

FIG. 7 schematically shows an example BIOS setting screen used in the storage device control method of FIG. 5.

DETAILED DESCRIPTION OF THE EMBODIMENTS

An embodiment of the present invention will be hereinafter described with reference to the drawings.

A configuration of a notebook PC 10 (information processing apparatus) according to the embodiment of the invention will be described with reference to FIGS. 1-3. The notebook PC 10 is equipped with plural storage devices, which are an SSD (solid-state drive) and an HDD (hard disk drive), for example. The SSD may be considered as a most suitable storage device for installing an operating system therein because it is higher in data access rate and lower in power consumption than the HDD. The embodiment is intended to automatically determine such a storage device (i.e., a storage device that is most suitable for installation of an operating system) and install the operating system therein.

Figure 1:
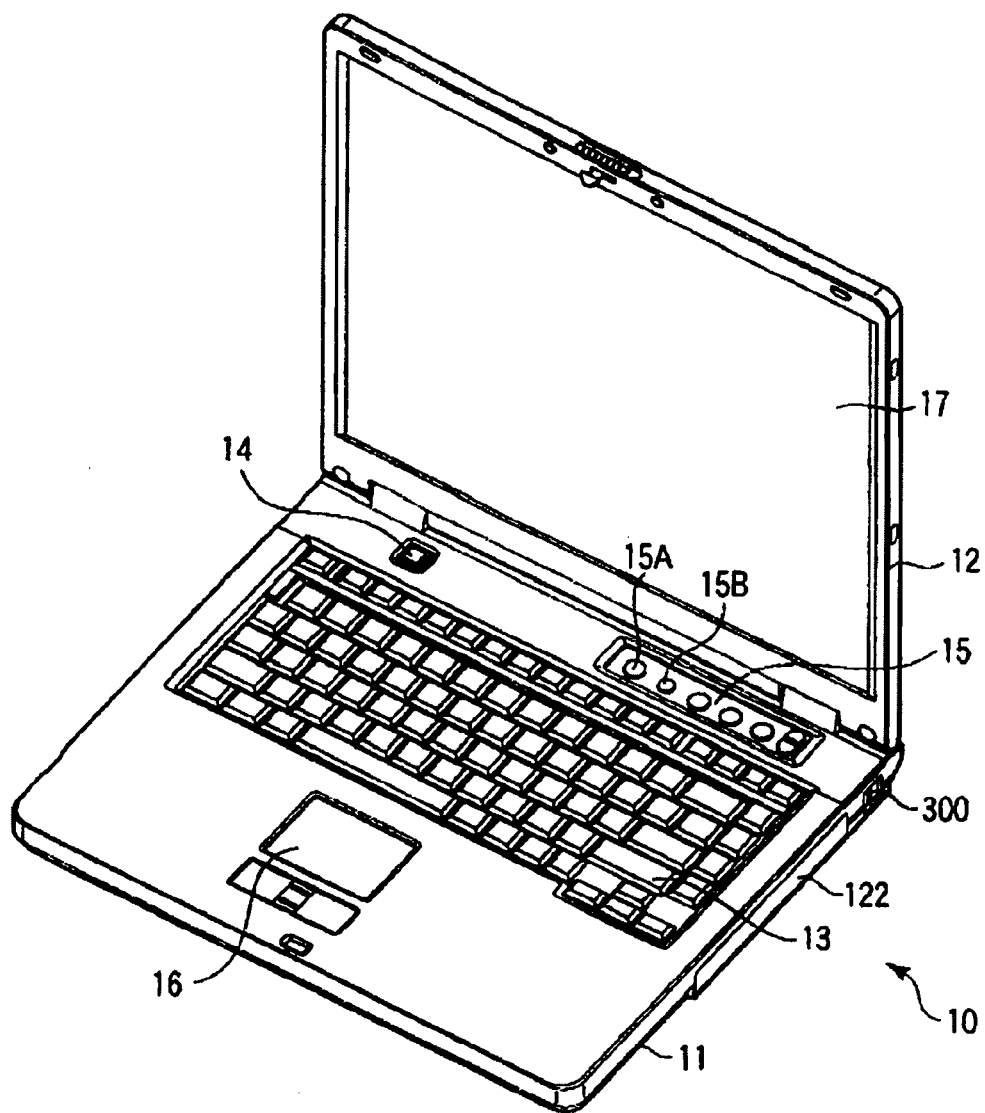
FIG. 1 is a perspective view showing an appearance of an information processing apparatus according to an embodiment of the present invention.

FIG. 1 is a perspective view of the notebook PC 10 in a state that a display unit 12 is opened. The notebook PC 10 is composed of a main unit 11 and the display unit 12. The display unit 12 incorporates a display device which is an LCD (liquid crystal display) 17. The display screen of the LCD 17 is disposed approximately at the center of the display unit 12.

The display unit 12 is attached the main unit 11 so as to be rotatable between an opened position and a closed position. The main unit 11 has a thin, box-shaped body, and a keyboard 13, a power button 14 for powering on/off the computer 10, an operation panel 15, and a touch pad 16 are provided on the top surface of the body. An optical disc drive (ODD; a drive for a CD and a DVD (digital versatile disc)) 122 is provided in the main unit 11 so as to be accessible through its right side surface. The optical disc drive 122 is used for installation of software or an operating system, reproduction of a DVD, and other purposes. A LAN cable connection terminal 300 is provided in the right side surface of the main unit 11 at a back face. Software or an operating system can also be installed over a LAN network via the LAN cable connection terminal 300. USB terminals (not shown) are provided in the back face of the main unit 11. As with the LAN cable connection terminal 300, each USB terminal enables installation of software or an operating system when a storage device is connected to it.

The operation panel 15, which is an input device through which to input an event corresponding to a pressed button to the computer 10, is provided with plural buttons for activating respective functions. The plural buttons include a TV activation button 15A, a DVD activation button 15B, etc.

Figure 2:
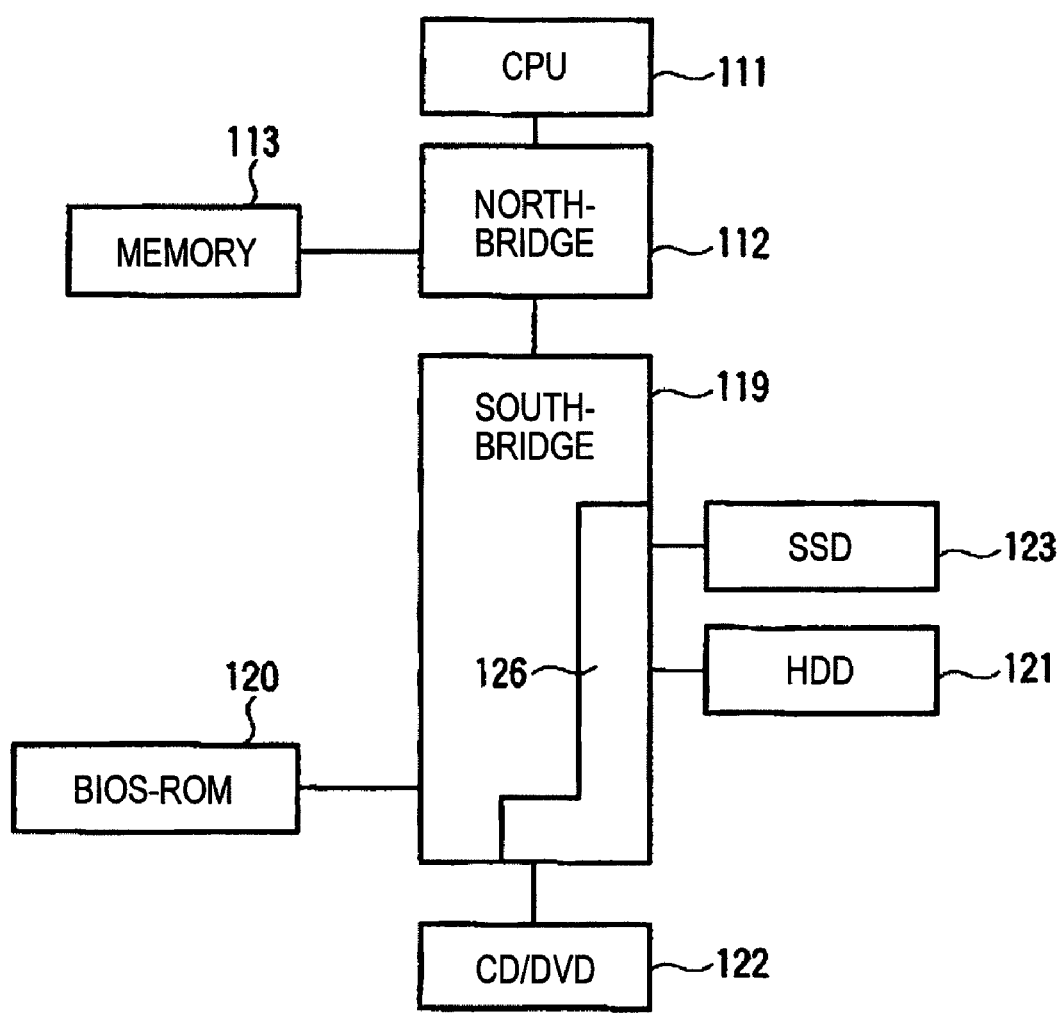
FIG. 2 is a block diagram outlining the configuration of the information processing apparatus according to the embodiment of the invention.

Next, the system configuration of the computer 10 will be outlined with reference to FIG. 2.

As shown in FIG. 2, the computer 10 is equipped with a CPU (which serves as a detection module, a determination module, and a control module) 111, a northbridge 112, a memory (main memory) 113, a southbridge 119, a SATA (serial advanced technology attachment) controller 126, a BIOS-ROM 120, an HDD 121, an SSD 123, the optical disc drive (ODD) 122, etc.

If a start of installation of an operating system from the ODD 122, for example, is detected, pre-stored pieces of device information of the plural storage devices which are provided in or connected to the main body 11, that is, the HDD 121 and the SSD 123, are acquired from the HDD 121 etc. and it is determined which storage device the operating system should be installed in to attain better performance of the computer 10 (i.e., priority order is determined). Then, the operating system is installed in the storage device having the highest priority rank.

Next, the system configuration of the computer 10 will be described in detail with reference to FIG. 3.

Figure 3:
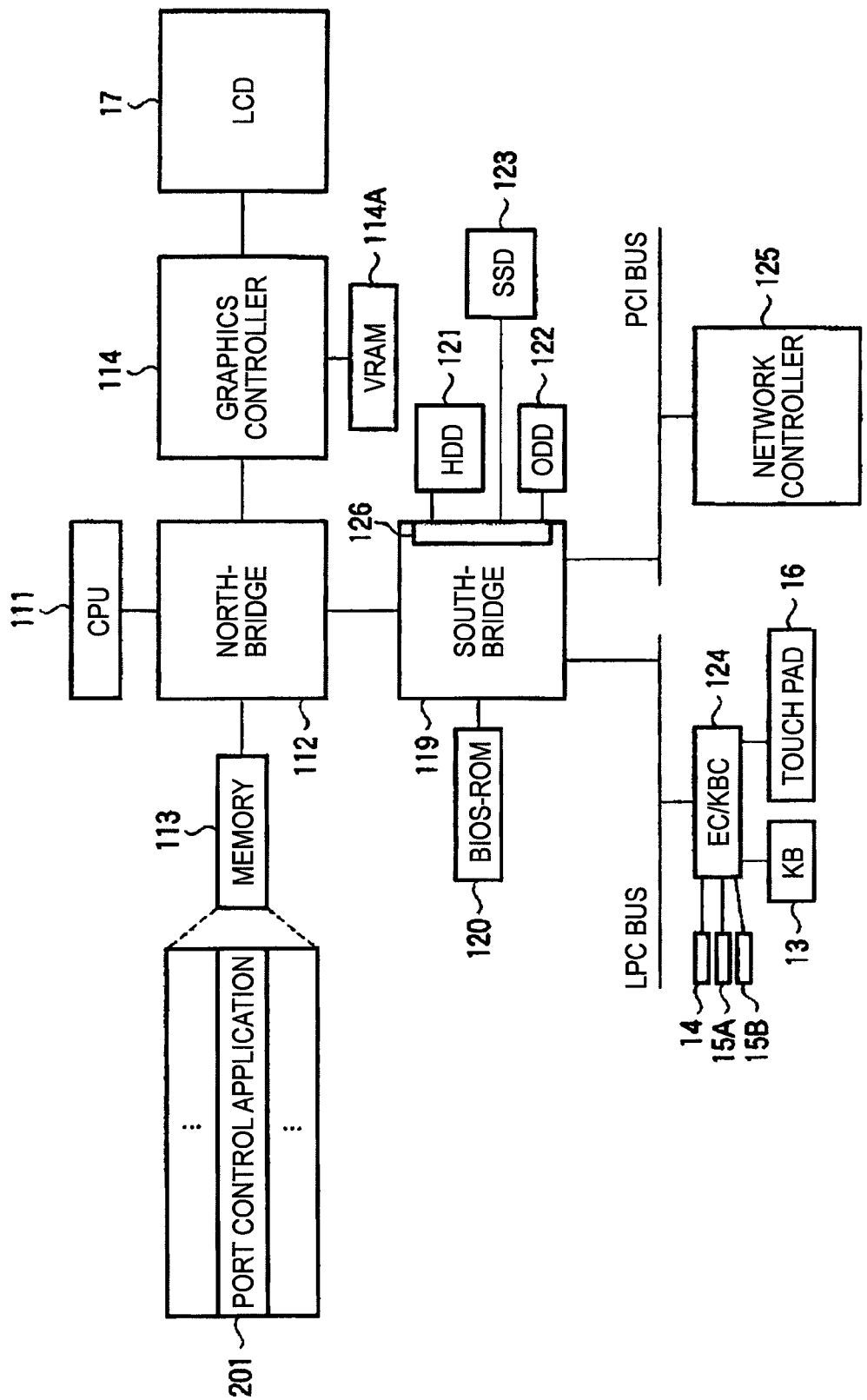
FIG. 3 is a block diagram showing, in detail, the configuration of the information processing apparatus according to the embodiment of the invention.

As shown in FIG. 3, the computer 10 is equipped with the CPU 111, the northbridge 112, the memory (main memory) 113, a graphics controller 114, the southbridge 119, the BIOS-ROM 120, the HDD 121, the SSD 123, the ODD 122, an embedded controller/keyboard controller IC (EC/KBC) 124, the LCD 17, the SATA controller 126, a network controller 125, etc.

The CPU 111, which is a processor provided to control the operations of the computer 10, runs an operating system (OS) to be loaded onto the memory 113 from the HDD 121, for example, and various application programs such as a port control application program (hereinafter also called a port control application; detection module, determination module, and control module) 201.

The SATA controller 126 controls port numbers of the plural storage devices which are provided in or connected to the main body 11, that is, the HDD 121 and the SSD 123, according to an instruction from the BIOS-ROM 120. More specifically, the SATA controller 126 performs processing of setting the ports of the storage devices other than a storage device having the highest priority rank unselectable by (invisible to) an operating system installed, processing of installing the operating system after performing the above selection-disabling processing, and other processing.

The SATA controller 126 also performs processing of detecting boot process for installation of an operating system, processing of acquiring pieces of device information from the plural respective storage devices and determining priority order according to the acquired pieces of device information if the detected boot process is originated from a device other than the plural storage devices, processing of installing the operating system in a storage device that is the first in the determined priority order, processing of determining priority order according to ascending order of the port numbers of ports to which the plural respective storage devices are connected if priority order cannot be determined on the basis of the acquired pieces of device information, and other processing. The term "device information" is rotation speed information of a storage device (flag information; stored in a BIOS-ROM of the storage device), device model name information that is stored in the HDD 121, for example, in advance, or the like.

The CPU 111 also runs a system BIOS (basic input/output system) which is stored in the BIOS-ROM 120. The system BIOS is a program for hardware control.

The northbridge 112 is abridge device for connecting a local bus of the CPU 111 to the southbridge 119. The northbridge 112 incorporates a memory controller for access-controlling the memory 113. The northbridge 112 also has a function of communicating with the graphics controller 114 via an AGP (accelerated graphics port) bus or the like.

The graphics controller 114 is a display controller for controlling the LCD 17 which is used as a display monitor of the computer 10. The graphics controller 114 generates a display signal to be sent to the LCD 17 on the basis of image data that is written to a video memory (VRAM) 114A.

The southbridge 119 controls individual devices on an LPC (low pin count) bus and individual devices on a PCI (peripheral component interconnect) bus. The southbridge 119 incorporates the SATA controller 126 for controlling the HDD 121, the ODD 122, and the SSD 123.

The HDD 121 and the SSD 123 are storage devices for storing various kinds of software and data. The SSD is a most suitable storage device to install an operating system in because it is higher in data access rate and lower in power consumption than the HDD. The SATA controller 126 can automatically determine such a storage device (i.e., a storage device that is most suitable for installation of an operating system) and install the operating system therein. Each of the HDD 121 and the SSD 123 is equipped with a BIOS-ROM (not shown) which is stored with various kinds of information, such as device (flag) information, of the HDD 121 or the SSD 123. Examples of the device information are rotation speed information of the HDD 121 and a model name.

The ODD 122 is a drive unit for installing an operating system from an optical disc medium and driving a storage medium such as a DVD in which a video content is stored.

The embedded controller/keyboard controller IC (EC/KBC) 124 is a one-chip microcomputer in which an embedded controller for power control and a keyboard controller for controlling the keyboard (KB) 13 and the touch pad 16 are integrated together. The EC/KBC 124 has a function of powering on/off the computer 10 in response to a manipulation on the power button 14 by the user. The EC/KBC 124 can also power on/off the computer 10 in response to a manipulation on the TV activation button 15A or the DVD activation button 15B by the user.

The network controller 125 is a communication device for communicating with an external network such as the Internet. The network controller 125 can also install an operating system over an external network.

The port control application 201 issues various instructions relating to controls that are performed by the SATA controller 126. The BIOS-ROM 120 performs controls relating to the port numbers of the HDD 121 and the SSD 123 which are the plural storage devices provided in or connected to the main body 11. More specifically, the BIOS-ROM 120 performs processing of setting the ports of the storage devices other than a storage device having the highest priority rank unselectable by (invisible to) an operating system installed, processing of installing the operating system after performing the above selection-disabling processing, and other processing. The port control application 201 also performs processing of detecting boot process for installation of an operating system, processing of acquiring pieces of device information from the plural respective storage devices and determining priority order according to the acquired pieces of device information if the detected boot process is of a device other than the plural storage devices, processing of installing the operating system in a storage device that is the first in the determined priority order, processing of determining priority order according to ascending order of the port numbers of ports to which the plural respective storage devices are connected if priority order cannot be determined on the basis of the acquired pieces of device information, and other processing.

Figure 4:
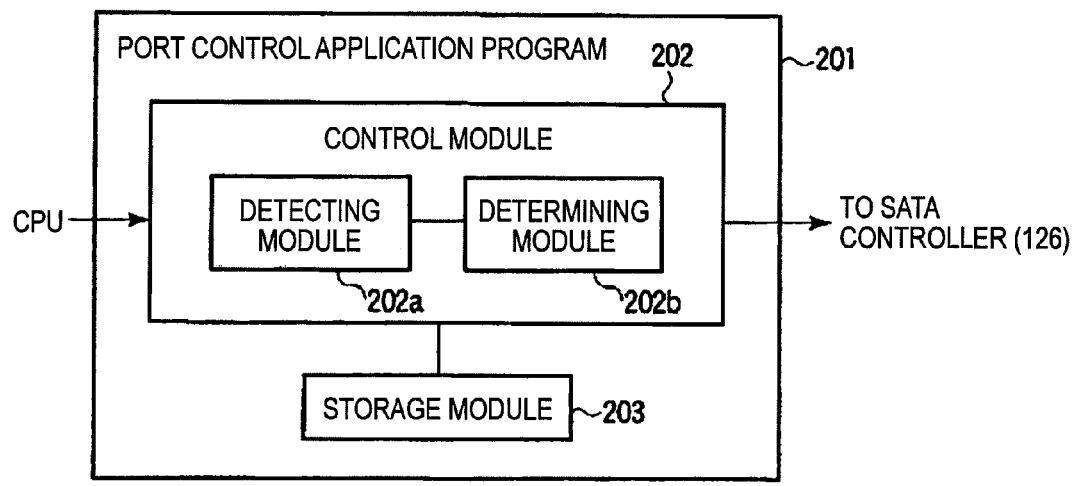
FIG. 4 is a block diagram showing the functional configuration of a port control application of the information processing apparatus according to the embodiment of the invention.

FIG. 4 is a block diagram showing the functional configuration of the port control application 201. The port control application 201 is provided with a control module 202 and a memory module 203. The control module 202 is provided with a detection module 202a and a determination module 202b.

Under the control of the CPU 111, the control module 202 installs an operating system in a storage device which is the first in priority order that has been determined by the determination module 202b. Processing of installing the operating system and other processing are performed after selection-disabling processing is performed. The detection module 202a detects boot process for installation of the operating system. The determination module 202b acquires pieces of device information from the plural respective storage devices if the detection module 202a has detected the boot process of a device other than the plural storage devices, and determines priority order on the basis of the acquired pieces of device information. If priority order cannot be determined on the basis of the acquired pieces of device information, the determination module 202b determines priority order according to ascending order of the port numbers of ports to which the plural respective storage devices are connected. Furthermore, the determination module 202b sets a higher priority rank to a storage device having a higher data transfer rate. The memory module 203 stores model names or the like as the pieces of device information of the storage devices.

Figure 5:
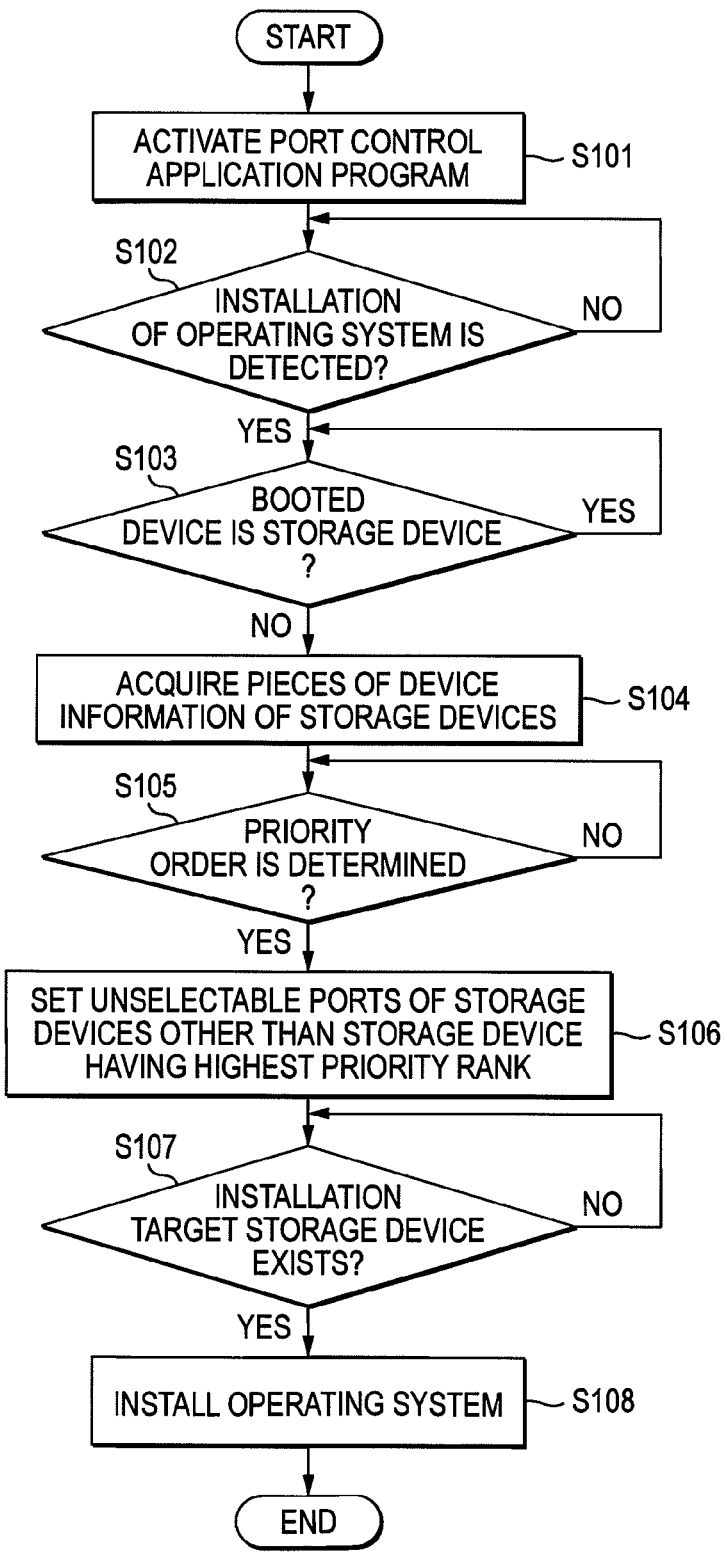
FIG. 5 is a flowchart of a storage device control method of the information processing apparatus according to the embodiment of the invention.

Next, a storage device control method of the information processing apparatus according to the embodiment will be described with reference to a flowchart of FIG. 5.

At step S101, the CPU 111 activates the port control application program 201 which is stored in the HDD 121, for example, and loads it into the memory 113. At step S102, the CPU 111 determines whether a start of installation of an operating program has been detected. Example installation sources of the operation system are the ODD 122, a USB memory that is connected to a USB terminal, and an arbitrary server (via the network controller 125). If determined at step S102 that a start of installation of an operating program has been detected (S102: yes), then the CPU 11 determines at step S103 whether the booted device is a storage device. The term "storage device" means each of the storage devices provided in (or connected to) the computer 10, that is, the HDD 121 and the SSD 123. If determined at step S103 that the booted device is not a storage device (S103: no), at step S104 the CPU 111 acquires pieces of device information of the plural respective storage devices provided in the computer 10. On the other hand, if determined at step S103 that the booted device is a storage device (S103: yes), the CPU 111 stops the operating system installation processing by way of precaution because this is the case that an installation file of the operating system has already been stored in the HDD 121 or the SSD 123. By making a proper setting, it is possible to continue the operating system installation processing even if the booted device is a storage device.

The CPU 111 determines priority order according to the pieces of device information that were acquired at step S104. If the acquired pieces of device information indicate that the plural storage devices provided in the computer 10 are the HDD 121 and the SSD 123, the SSD 123 which is higher in data transfer rate and lower in power consumption is given a higher priority rank. Whether the plural storage devices provided in the computer 10 are the HDD 121 and the SSD 123 is determined in the following manner. The BIOS-ROM that is provided in each of the HDD 121 and the SSD 123 is accessed. If the BIOS-ROM is stored with a rotation speed flag (information), the storage device is determined to be the HDD 121. If the BIOS-ROM is not stored with a rotation speed flag, the storage device is determined to be the SSD 123.

In acquiring pieces of device information from the plural respective storage devices provided in the computer 10, if the storage device is the HDD 121, the device information of the HDD 121 is acquired from the BIOS-ROM (not shown) provided in the HDD 121. In this case, the device information is, for example, a rotation speed of the HDD 121. Where plural HDDs are provided in the computer 10, an HDD having a higher rotation speed is given a higher priority rank. If two HDDs have the same rotation speed, an HDD for which the port number of a port to which the HDD is connected is smaller is given a higher priority rank. For example, if two HDDs have port numbers "0" and "1," respectively, the HDD having the port number "0" is given a higher priority rank. Port number information is acquired from the SATA controller 126, for example.

If the storage device is the SSD 123, device information of the SSD 123 is read out by searching pieces of device model name information that are stored in advance in the HDD 121, for example. Example device model name information that is stored in advance in the HDD 121, for example, is a model name of the SSD 123 and a corresponding specification which are stored as table data in advance (see FIG. 6). The corresponding specification is data transfer rates, for example. The corresponding specification is a data transfer rate, for example. Where plural SSDs are provided in the computer 10, an SSD having a higher data transfer rate is given a higher priority rank. In the example of FIG. 6, the model "SSD-TSB001245" is higher in both of the read transfer rate and the write transfer rate than the model "SSD-TSB987654," the former is given a highest priority rank.

Then, the process proceeds to step S105, where the CPU 111 determines whether priority order has been determined. If it is determined that priority order of the plural storage devices provided in the computer 10 has been determined (S105: yes), at step S106 the CPU 111 sets unselectable the ports of the storage devices other than a storage device having the highest priority rank (e.g., SSD 123). For example, if the port numbers of the SSD 123 and the HDD 121 are "0" and "1," respectively, the port of the storage device other than the SSD 123 having the port number "0" is set unselectable. The SATA controller 126 performs a register control so that the operating system cannot select the ports of the storage devices other than the storage device having the highest priority rank (i.e., those ports are set invisible to the operating system) when the operating system is installed.

If determined that the installation target storage device exists (S107: yes), at step S108 the CPU 111 selects the storage device having the highest priority rank (e.g., SSD 123) and installs the operating system therein. As shown in FIG. 7, setting of each of the plural storage devices provided in the computer 10 may be made in BIOS setup processing. For example, "access enable" or "access disable" is set for each storage device as an access setting to be employed at the time of installation of an operating system.

The embodiment makes it possible to automatically select a storage device that is most suitable (highest in performance) for installation of an operating system. Since the storage devices other than the optimum storage device are set unselectable, the operating system is prevented from being installed erroneously in a storage device in which the operating system should not be installed.

The information processing apparatus according to the invention is not limited to a computer and may be any of various consumer information processing apparatus such as a PDA. Furthermore, the functions of the port control application 201 may be implemented by hardware such as a DSP or a microcomputer.

Although the embodiment according to the present invention has been described above, the present invention is not limited to the above-mentioned embodiment but can be variously modified.

Additional advantages and modifications will readily occur to those skilled in the art. Therefore, the invention in its broader aspects is not limited to the specific details and representative embodiments shown and described herein. Accordingly, various modifications maybe made without departing from the spirit or scope of the general inventive concept as defined by the appended claims and their equivalents.

What is claimed is:

1. An information processing apparatus comprising:
a processor configured to execute an operating system;
a plurality of storage devices connected to the processor;
a detection module configured to detect a boot process for installing the operating system;
a determination module configured to receive device information from the storage devices and to determine a priority rank based on the device information when the detection module detects the boot process being originated from a device other than the storage devices and based on port numbers to which the storage devices are connected when the priority rank is undeterminable from the device information; and
a control module configured to install the operating system into the storage device that is determined to be of a highest priority rank by the determination module.

2. The apparatus of claim 1 further comprising:
a memory module configured to previously store model name information indicative of model names and specifications of the storage devices,
wherein the determination module is configured to determine the priority rank based on rotation speed information indicative of rotation speeds of disk media provided in the storage devices included in the device information and the model name information stored in the memory module.

3. The apparatus of claim 2,
wherein the determination module is configured to set the priority rank based on transfer rates which are included in the specifications.

4. The apparatus of claim 1, wherein the determination module is configured to set a port number to which the storage devices other than the storage device determined to be of the highest priority rank are connected, to be unselectable by the operation system.

5. The apparatus of claim 4, wherein the control module is configured to start installing the operating system after the determination module sets the ports to be unselectable.

6. The apparatus of claim 1 further comprising:
an optical disc drive,
wherein the determination module is configured to receive the device information to determine the priority rank when the detection module detects the boot process being originated from the optical disc drive.

7. A method for controlling a plurality of storage devices connected to a processor provided in an information processing apparatus, the method comprising, by the processor;
detecting a boot process for installing the operating system;
receiving device information from the storage devices and determining a priority rank based on the device information when the boot process originated from a device other than the storage devices is detected and based on port numbers to which the storage devices are connected when the priority rank is undeterminable from the device information; and
installing the operating system into the storage device that is determined to be of a highest priority rank.

8. The method of claim 7 further comprising:
storing model name information indicative of model names and specifications of the storage devices,
wherein the priority rank is determined based on rotation speed information indicative of rotation speeds of disk media provided in the storage devices included in the device information and the model name information.

* * * * *